United States Patent [19]

Udagawa

[11] Patent Number: 4,861,046
[45] Date of Patent: Aug. 29, 1989

[54] STEEL LAMINATE GASKET WITH SEPARATE BEADS

[75] Inventor: Tsunekazu Udagawa, Ichikawa, Japan

[73] Assignee: Ishikawa Gasket Co., Ltd., Tokyo, Japan

[21] Appl. No.: 194,377

[22] Filed: May 16, 1988

[51] Int. Cl.[4] .............................................. F16J 15/08
[52] U.S. Cl. ................................ 277/235 B; 277/200; 277/236
[58] Field of Search ............... 277/200, 207, 211, 213, 277/215, 233, 234, 235 R, 235 A, 235 B, 236

[56] References Cited

U.S. PATENT DOCUMENTS 3,714,260  12/1987  Udagawa ..................... 277/236 X
4,676,575   6/1987  Cobb ............................ 277/235 B

FOREIGN PATENT DOCUMENTS 710994  6/1965  Canada ............................ 277/207

0230804  8/1987  European Pat. Off. ........ 277/235 R

Primary Examiner—Robert S. Ward
Attorney, Agent, or Firm—Frank J. Jordan; C. Bruce Hamburg; Manabu Kanesaka

[57] ABSTRACT

A steel laminate gasket of the invention is used for an internal combustion engine having at least one hole therein. The gasket comprises a first plate having at least one first hole and a first bead situated adjacent to the first hole to surround the same, and a second plate having at least one second hole and at least one second bead situated adjacent to the second hole to surround the same. The distance from the second hole to the second bead is different from that from the first hole to the first bead. When the first and second plates are assembled together, the first and second beads face against the second and first plates, respectively. When the gasket is tightened, the first and second beads form a plurality of corrugated beads at selected areas around the hole to securely seal the same.

12 Claims, 4 Drawing Sheets

_STEEL LAMINATE GASKET WITH SEPARATE BEADS_

BACKGROUND OF THE INVENTION AND RELATED ART STATEMENT

The present invention relates to a steel laminate gasket for an internal combustion engine having two separate beads for providing desired sealing pressure around a hole to be sealed.

The steel laminate gasket of the invention can be used widely, such as a regular gasket situated between two engine blocks, cylinder head gasket and manifold gasket. Further, in the gasket of the present invention, cylinder holes Hc, water holes Hw, oil holes Ho, bolt holes Hb and the like, as shown in FIG. 1 can be easily and securely sealed.

In the steel laminate gasket, one of the very important things when the steel laminate gasket is designed is how portions around holes of the engine are securely sealed. If the portions around the holes of the engine are not properly sealed, the engine does not operate as intended. In this respect, there have been proposed many methods.

One of conventional methods for sealing around holes, such as a cylinder hole Hc, is shown in FIG. 2, wherein a gasket 20 comprises an upper plate 21, a lower plate 24, a middle plate 22, and a middle plate 23 having a bead 23a around a cylinder hole Hc to be sealed. The lower plate 24 is provided with a curved portion 24a located around the hole Hc, and a flange portion 24b situated above the upper plate 21. In the gasket 20, the curved portion 24a together with the bead 23a seals around the hole Hc.

When the gasket 20 is assembled, after the plates are stacked together, the curved portion 24a must be bent. In this respect, in case a hole to be sealed is small, configuration of the hole is complicated or metal quality relative to bending is not good, a curved portion may crack. If a crack is formed on the bending portion, sealing ability of the gasket decreases, and therefore the gasket can not be used any more. Therefore, the bending portion can not be employed for sealing all kinds of holes.

When the curved or bending portion is not used, a gasket 25 as shown in FIG. 3 may be used. The gasket 25 comprises an upper plate 26, a lower plate 28 and a middle plate 27 having a bead 27a around a hole Hc. In this gasket 25, the bead 27a only provides a sealing pressure around the hole Hc. Therefore, fluid passing through the hole Hc may possibly permeate through the plates. The sealing ability of the gasket 25 is not good.

In view of the prior art as stated above, a steel laminate gasket with high sealing ability has been proposed and filed as Ser. No. 067,567 on June 26, 1987. The gasket is provided with at least two plates with beads respectively, wherein when the gasket is tightened, the beads diagonally push with each other to provide high sealing pressure around a hole.

The gasket of the present invention does not provide so high sealing pressure as in the gasket disclosed in Ser. No. 07/067,567, now U.S. Pat. No. 4,759,585, but the gasket of the invention can provide sufficient sealing pressure and securely seal around a hole to be sealed.

Accordingly, one object of the present invention is to provide a steel laminate gasket, which can provide moderate sealing pressure around a hole and seal securely around the hole.

Another object of the present invention is to provide a steel laminate gasket as stated above, wherein sealing pressure applied around a hole to be sealed can be controlled as desired.

A further object of the present invention is to provide a steel laminate gasket as stated above, which can be easily and economically manufactured.

Further objects and advantages of the invention will be apparent from the following description of the invention.

SUMMARY OF THE INVENTION

A steel laminate gasket of the invention is designed to be installed in an internal combustion engine having at least one hole therein. The gasket comprises a first plate and a second plate. The first plate is provided with at least one first hole therein corresponding to the hole of the engine and a first bead situated adjacent to the first hole to surround the same. The second plate is provided with at least one second hole corresponding to the hole of the engine, and at least one second bead situated adjacent to the second hole to surround the same.

The distance from the second hole to the second bead is different from that from the first hole to the first bead. When the first and second plates are assembled together, the first and second beads face against the second and first plates, respectively. When the gasket is tightened, the first and second beads form a plurality of corrugated beads at selected areas around the hole to securely seal around the same.

The surface pressures formed on the first and second beads are different from each other when the gasket is tightened. In order to provide different surface pressures on the first and second beads, the thickness and hardness of the first and second plates may be changed. The widths of the first and second beads may be changed as well.

DETAILED DESCRIPTION OF PREFERRED EMBODIMENTS

Figure 1:
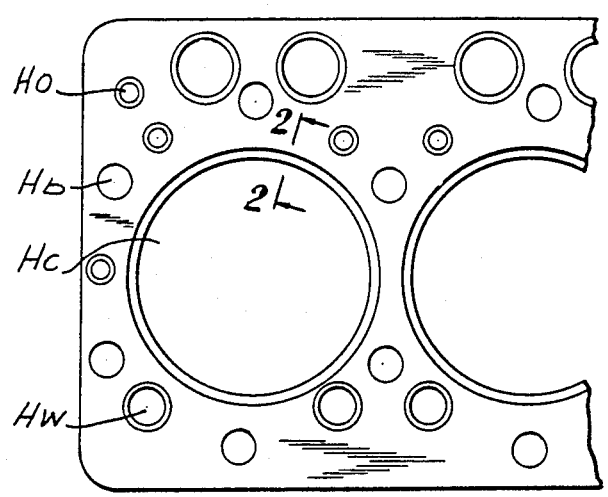
FIG. 1 is a partial plan view of a conventional cylinder head gasket.
Figure 2:
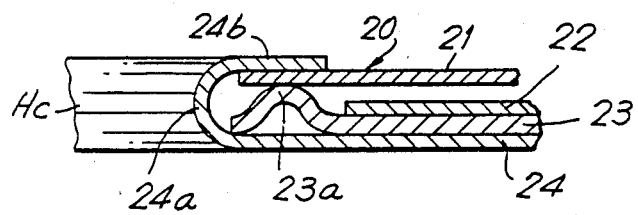
FIG. 2 is an enlarged section view taken along line 2—2 in FIG. 1.
Figure 3:
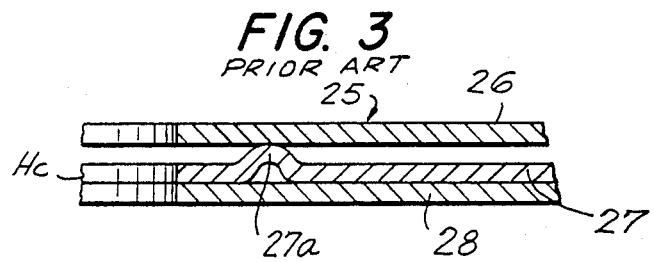
FIG. 3 is a section view similar to FIG. 2 for showing a different conventional gasket.
Figure 4:
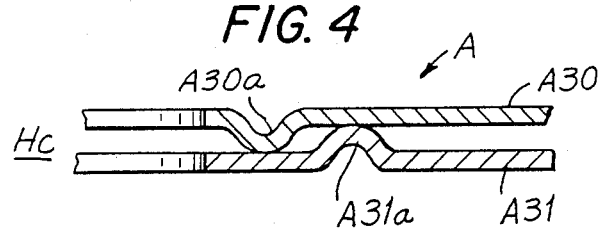
FIG. 4 is an explanatory section view, similar to FIG. 2, of a first embodiment of a steel laminate gasket of the present invention.

Referring to FIG. 4, a first embodiment A of a steel laminate gasket of the invention is shown. The gasket A as shown in FIG. 4 is a cylinder head gasket, similar to FIG. 1, and is provided with a plurality of holes, i.e. cylinder holes Hc, water holes Hw, oil holes Ho and bolt holes Hb. Areas around the cylinder holes Hc, water holes Hw and oil holes Ho are designed to be sealed in accordance with the present invention. For explanation, an area adjacent the cylinder hole Hc is shown as a section view in FIG. 4. The structures around the water holes Hw and oil holes Ho are, except size, the same as the structure as shown in FIG. 4. Therefore, explanation around the water holes Hw and oil holes Ho is eliminated.

The gasket A comprises an upper plate A30 with a bead A30a around a cylinder hole Hc, and a lower plate A31 with a bead A31a around the cylinder hole Hc. The distance from the cylinder hole Hc to the bead A30a is shorter than the distance from the cylinder hole Hc to the bead A31a.

In the gasket A, the beads A30a, A31a do not contact with each other. The thickness of the plates A30, A31 and the sizes of the beads A30a, A31a are the same.

When the gasket A is situated between a cylinder head and a cylinder block (both not shown) and is tightened, the beads A30a, A31a are pushed against the plates A31, A30 respectively and forms a plurality of corrugated beads. Accordingly, the area around the cylinder hole Hc is sealed by two sets of corrugated beads, which are formed by the beads A30a, A31a. Since the respective sets of the corrugated beads are located slightly away from each other, extremely high sealing pressure is not formed or concentrated at one area. Instead, wide sealing pressure is formed around the cylinder hole Hc. Consequently, the area around the cylinder hole Hc can be securely sealed.

The plates A30, A31 are made of the same material. However, the upper plate A30 which has the bead A30a located close to the cylinder hole Hc may be made of a material strong against heat, such as a stainless steel.

Figure 5:
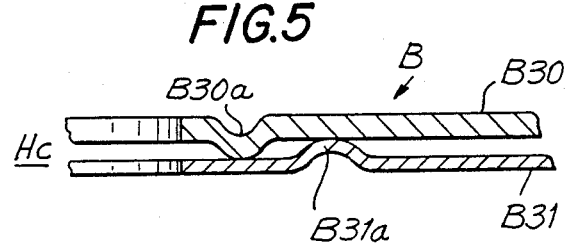
FIGS. 5–7 are section views, similar to FIG. 4, of second to fourth embodiments of the present invention.

FIG. 5 shows a second embodiment B of a steel laminate gasket of the invention. The gasket B comprises an upper plate B30 with a bead B30a, and a lower plate B31 with a bead B31a, similar to the basket A. In the gasket B, the thickness of the upper plate B30 is thicker than that of the lower plate B31. As a result, the bead B30a forms, when the gasket B is tightened, a sealing pressure stronger than that of the bead B31a.

Namely, in the gasket B, since the upper plate B30 is formed of a plate thicker than the lower plate, when the gasket B is tightened, a strong sealing pressure is formed adjacent to the cylinder hole Hc. The gasket B is especially effective for an engine with high combustion pressure, such as a diesel engine.

Figure 6:
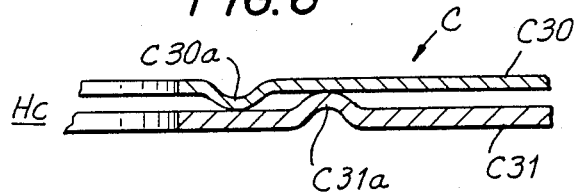

FIG. 6 shows a third embodiment C of a steel laminate gasket of the invention. The gasket C comprises an upper plate C30 with a bead C30a, and a lower plate C31 with a bead C31a, similar to the gasket A. In the gasket C, the thickness of the upper plate C30 is thinner than that of the lower plate C31. Therefore, when the gasket C is tightened, the bead C31a forms a sealing pressure stronger than that of the bead C30a. Namely, since the upper plate C30 is formed of a plate thinner than the lower plate C31, a strong sealing pressure is formed around an area slightly away from the cylinder hole Hc.

Figure 7:
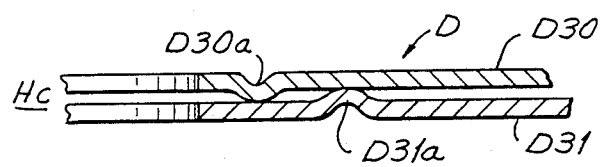

FIG. 7 shows a fourth embodiment D of a steel laminate gasket of the invention. The gasket D comprises an upper plate D30 with a bead D30a, and a lower plate D31 with a bead D31a, similar to the gasket A.

In the gasket D, the thickness of the plates D30, D31 is the same, and the height of the beads D30a, D31a is the same. However, the width of the bead D30a is shorter than that of the bead D31a. Namely, the projecting angle of the bead D30a is sharper than that of the bead D31a. Accordingly, when the gasket D is tightened, the bead D30a forms a sealing pressure stronger than the bead D31a. This structure is especially effective in case one of the beads must form a strong tightening pressure though the upper and lower plates must have the same thickness.

Figure 8:
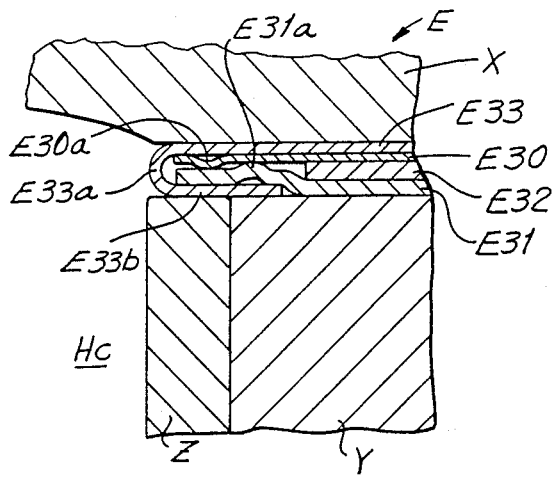
FIG. 8 is an explanatory section view of a fifth embodiment of a steel laminate gasket of the invention, wherein the gasket is installed in an engine.

FIG. 8 shows a fifth embodiment E of a steel laminate gasket of the invention. The gasket E is installed between a cylinder head X and a cylinder block Y with a cylinder liner Z.

The gasket E comprises an upper plate E30 with a bead E30a, and a lower plate E31 with a bead E31a, similar to the gasket C. Further, the gasket E comprises a surface pressure regulation plate E32 situated between the upper and lower plates E30, E31, and an upper outer plate E33. The beads E30a, E31a are located in a hole of the surface pressure regulation plate E32, so that the surface pressure regulation plate E32 operates to control pressure applied to the beads. The upper outer plate E33 includes a curved portion E33a adjacent the cylinder hole Hc, and a flange E33b located below the lower plate E31. The curved portion E33a protects the upper and lower plates E30, E31 from high heat and pressure in the cylinder.

In an engine with a cylinder liner Z, in case a cylinder head X is tightened strongly by bolts against a cylinder block Y, a strong surface pressure is applied to the cylinder liner Z. As a result, while the engine is operating, the cylinder liner Z may fall downwardly, so that sealing between the cylinder liner Z and the cylinder head X can not be made. In the gasket E, the surface pressure generated on the cylinder liner Z is made small to prevent the falling of the cylinder liner Z, while the sealing between the cylinder head X and the cylinder block Y is securely made. Namely, the thickness of the upper plate E30 for forming the bead E30a is made thin to reduce the surface pressure generated on the cylinder liner Z, while the surface pressure generated on the cylinder block Y by the bead E31a is made high to thereby tightly seal between the cylinder head X and the cylinder block Y.

In the embodiment E, the surface pressure formed on the cylinder liner is made small by using a thin plate E30 for the bead E30a. However, in case the plate E30 can not be made thin, it is possible to reduce the surface pressure applied to the cylinder liner by changing the plate E30 to a plate made of a soft material or a shape of the bead, i.e. projecting angle, from an acute one to a moderate one.

Figure 9:
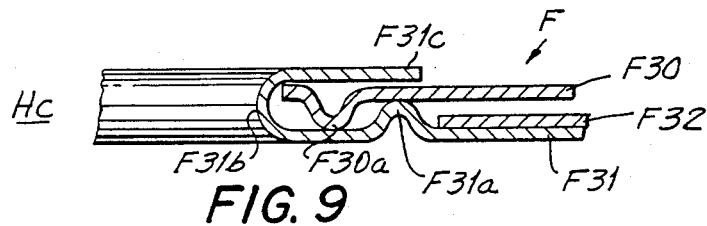
FIGS. 9–11 are section views, similar to FIG. 4, of sixth to eighth embodiments of the present invention.

FIG. 9 shows a sixth embodiment F of a steel laminate gasket of the invention. The gasket F comprises an upper plate F30 with a bead F30a, a lower plate F31 with a bead F31a, and a surface pressure regulation plate F32 situated between the upper and lower plates F30, F31. The lower plate F31 is further provided with a curved portion F31b adjacent the cylinder hole Hc, and a flange F31c situated above the upper plate F30. The flange F31c extends away from the cylinder hole Hc to cover both beads F30a, F31a.

In the gasket F, since the lower plate F31 is provided with the curved portion F31b with the flange F31c, the gasket F possesses an extra sealing portion in addition to the beads F30a, F31a. Therefore, the sealing ability of the gasket F is improved. Further, since the upper plate F30 is covered around the cylinder hole Hc with the curved portion F31b of the lower plate F31, the upper plate F30 may be made of a material which has a good resiliency but is not so strong against heat.

Figure 10:
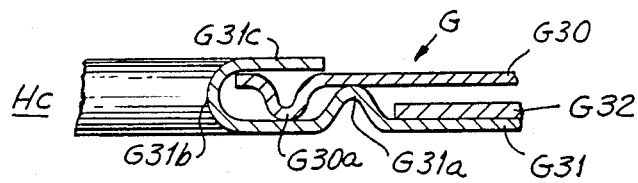

FIG. 10 shows seventh embodiment G of a steel laminate gasket of the invention. The gasket G comprises an upper plate G30 with a bead G30a, a lower plate G31 with a bead G31a, a curved portion G31b and a flange G31c, and a surface pressure regulation plate G32, similar to the gasket F. In the gasket G, the flange G31c extends to cover the bead G30a only. As a result, an amount of compression of the bead G31a, i.e. surface pressure formed at the bead G31a, can be reduced.

Figure 11:
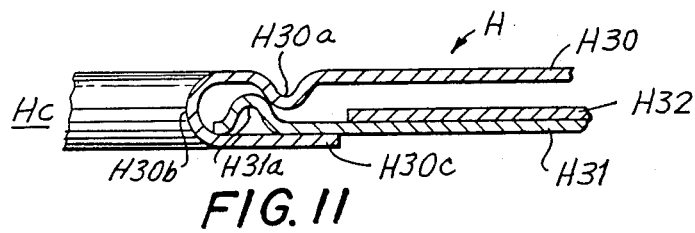
Figure 12:
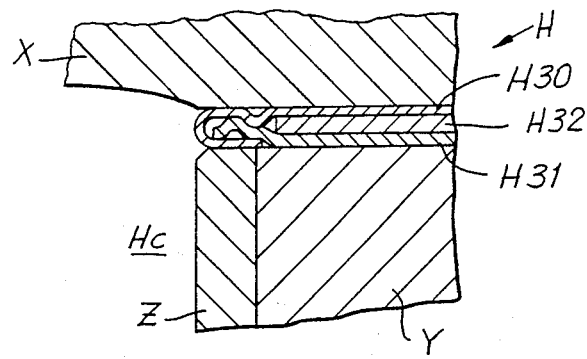
FIG. 12 is an explanatory section view of the eighth embodiment of the invention for showing that the gasket is installed in an engine.

FIGS. 11 and 12 show an eighth embodiment H of a steel laminate gasket of the invention. The gasket H comprises an upper plate H30 with a bead H30a, a lower plate H31 with a bead H31a, and a surface pressure regulation plate H32 situated between the upper and lower plates H30, H31. The upper plate H30 further includes a curved portion H30b around a cylinder hole Hc, and a flange H30c situated under the lower plate H31. When the gasket H is assembled, shoulder portions of the beads H30a, H31a contact with each other.

The gasket H is especially useful for an engine having a cylinder head X and cylinder block Y with a cylinder liner Z, as shown in FIG. 12. When the gasket H is tightened, the beads H30a, H31a push against each other to thereby provide a strong sealing pressure thereat. Further, since the flange H30c is located above the cylinder liner Z, even if a step is formed on a boundary between the cylinder block Y and the cylinder liner Z, the gasket H can absorb the step.

Figure 13:
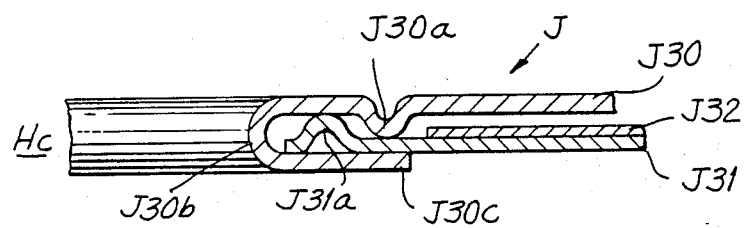
FIGS. 13 and 14 are section views, similar to FIG. 4, of ninth and tenth embodiments of the present invention.

FIG. 13 shows a ninth embodiment J of a steel laminate gasket of the invention. The gasket J comprises an upper plate J30 having a bead J30a, a curved portion J30b and a flange J30c, a lower plate J31 with a bead J31a, and a surface pressure regulation plate J32, similar to the gasket H. In the gasket J, however, when the gasket is assembled, the beads J30a, J31a do not contact with each other. Also, the thickness of the plate J30 is made thicker than that of the plate J31.

The gasket J is designed to be installed in an engine having a cylinder head and a cylinder block with a cylinder liner, as shown in the gasket H. When the gasket J is installed in the engine, the bead J30a is located above the cylinder block and the bead J31a is located above the cylinder liner. Since the plate J30 is made of a thick plate, the bead J30a can provide a strong sealing pressure to thereby tightly seal around the cylinder hole.

Figure 14:
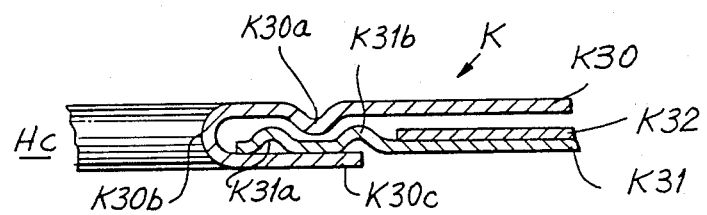

FIG. 14 shows a tenth embodiment K of a steel laminate gasket of the invention. The gasket K comprises an upper plate K30 having a bead K30a, a curved portion K30b and a flange K30c, a lower plate K31 with a bead K31a, and a surface pressure regulation plate K32, similar to the gasket J. In the gasket K, however, the lower plate K31 is further provided with a bead K31b. When the gasket K is assembled, the bead K30 is situated between the two beads K31a, K31b, so that an area around the cylinder hole Hc is securely sealed by the curved portion and the three beads.

In the present invention, a gasket comprises at least two metal plates, each having at least one bead around a hole of an engine. The distances from the hole of the engine to the respective beads are different, so that sealing areas sealed by the beads can be determined as desired. Further, the sealing pressure formed by the beads can be determined as desired by changing the hardness and thickness of the metal plates, and the shape of the beads. In the present invention, a desired sealing condition can be formed around a hole to be sealed in view of the characteristics of an engine.

While the invention has been explained with reference to the specific embodiments of the invention, the explanation is illustrative and the invention is limited only by the appended claims.

What is claimed is:

1. A steel laminate gasket for an internal combustion engine having at least one hole therein, comprising:
a first plate having at least one first hole therein corresponding to the hole of the engine, and a first bead situated adjacent to the first hole to surround the same, and
a second plate having at least one second hole therein corresponding to the hole of the engine, and at least one second bead situated adjacent to the second hole to surround the same, the distance form the second hole to the second bead being different from the distance from the first hole to the first bead, said first and second beads facing against the second and first plates respectively when the first and second plates are assembled together and forming a plurality of corrugated beads at selected areas around the hole to securely seal around the same when the gasket is tightened.

2. A steel laminate gasket according to claim 1, wherein surface pressure formed on the first and second beads is different from each other when the gasket is tightened.

3. A steel laminate gasket according to claim 2, wherein the thickness of the first and second plates is different from each other to provide different surface pressure on the first and second beads.

4. A steel laminate gasket according to claim 2, wherein the hardness of the first and second plates is different from each other to provide different surface pressure on the first and second beads.

5. A steel laminate gasket according to claim 2, wherein the width of the first and second beads is different from each other to provide different surface pressure on the first and second beads.

6. A steel laminate gasket according to claim 2, further comprising a third plate situated above the first plate, said third plate having a third hole, a curved portion situated inside the first and second holes to define the third hole, and a flange situated under the second plate.

7. A steel laminate gasket according to claim 6, wherein said flange extends away from the third hole so that the flange is located above the first and second beads.

8. A steel laminate gasket according to claim 7, further comprising a fourth plate having a fourth hole with a diameter larger than the diameter of the first and second beads, said fourth plate being situated between the first and second plates so that the first and second beads are located inside the fourth hole, said fourth plate operating as a surface pressure regulation plate for the first and second beads.

9. A steel laminate gasket according to claim 2, wherein said second plate is provided with a curved portion situated inside the first hole to define the second hole, and a flange situated over the first plate to extend at least above the first bead.

10. A steel laminate gasket according to claim 9, further comprising a fourth plate having a fourth hole with a diameter larger than the diameter of the first and second beads, said fourth plate being situated between the first and second plates so that the first and second beads are located inside the fourth hole, said fourth plate operating as a surface pressure regulation plate for the first and second beads.

11. A steel laminate gasket according to claim 2, wherein said first plate is provided with a curved portion situated inside the second hole to define the first hole, and a flange situated under the second plate, said gasket further including a surface pressure regulation plate between the first and second plate, said first and second beads being arranged so that when the gasket is tightened, the first and second beads abut against each other.

12. A steel laminate gasket according to claim 2, wherein said first plate is provided with a curved portion situated inside the second hole to define the first hole, a flange situated under the second plate, said second plate further including an additional bead situated outside the second bead to surround the same, said first bead, when the first and second plates are assembled, being situated between the second bead and additional bead.

* * * * *